(12) United States Patent
Takeko et al.

(10) Patent No.: US 7,585,570 B2
(45) Date of Patent: Sep. 8, 2009

(54) ADHESIVES AND OPTICAL LAMINATES INCLUDING THE SAME

(75) Inventors: Ryu Takeko, Ashiya (JP); Atsushi Higo, Toyonaka (JP); Akira Kawamura, Izumisano (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 350 days.

(21) Appl. No.: 11/279,313

(22) Filed: Apr. 11, 2006

(65) Prior Publication Data

US 2006/0252863 A1 Nov. 9, 2006

(30) Foreign Application Priority Data

Apr. 14, 2005 (JP) .............................. 2005-116587

(51) Int. Cl.
*B32B 27/30* (2006.01)
*B32B 9/04* (2006.01)

(52) U.S. Cl. ..................... 428/507; 428/447; 428/448; 428/452; 428/428; 428/1.5; 428/1.52; 428/1.55; 525/100; 525/101; 525/102; 525/191; 525/222; 525/227

(58) Field of Classification Search ........................ None
See application file for complete search history.

(56) References Cited

U.S. PATENT DOCUMENTS 5,902,847 A 5/1999 Yanagi et al.
2006/0159915 A1* 7/2006 Chang et al. .......... 428/355 AC

FOREIGN PATENT DOCUMENTS

| JP | 9-40907 | 2/1997 |
|---|---|---|
| JP | 9-40908 | 2/1997 |
| JP | 9-40909 | 2/1997 |
| JP | 9-40911 | 2/1997 |
| JP | 2000-109771 | 4/2000 |
| JP | 2000-109771 A * | 4/2000 |
| JP | 2002-121521 | 4/2002 |
| JP | 2002-372619 A * | 12/2002 |
| JP | 3487940 | 10/2003 |

OTHER PUBLICATIONS

Computer generated translation for KR 1020000267624 (2000).*
Computer generated translation for JP 2002-372619 (2002).*

* cited by examiner

*Primary Examiner*—Marc S Zimmer
(74) *Attorney, Agent, or Firm*—Foley & Lardner LLP

(57) ABSTRACT

To provide an adhesive comprising an acrylic resin (1), an acrylic resin (2), a silicone oligomer (3) and a crosslinking agent (4): wherein
the acrylic resin (1) comprises a structural unit (a) derived from a monomer (A) and a structural unit (b) derived from a monomer (B) and has a weight-average molecular weight of 1,000,000 to 2,000,000, wherein the (A) is a (meth)acrylic ester represented by the formula (A)

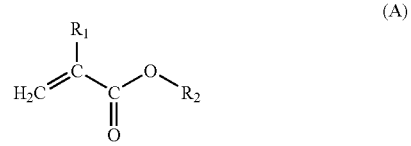

(A)

(wherein $R_1$ represents hydrogen atom or methyl group, and $R_2$ represents alkyl or aralkyl groups having 1 to 14 carbon atoms wherein hydrogen atom(s) of the $R_2$ may be substituted with alkoxy group having 1 to 10 carbon atoms), and
the (B) is at least any one of a (B-1) and a (B-2) wherein
the (B-1) is a monomer comprising carboxyl group and one olefinic double bond, and
the (B-2) is a monomer comprising at least one polar functional group selected from the group consisted of hydroxyl group, amide group, amino group, epoxy group, oxetanyl group, aldehyde group and isocyanate group and an olefinic double bond;
the acrylicresin (2) comprises the structural unit (a) and the structural unit (b) and has a weight-average molecular weight of 50,00 to 500,000; and
the silicone oligomer (3) has 2 to 100 structural units (s) derived from a compound (s) represented by

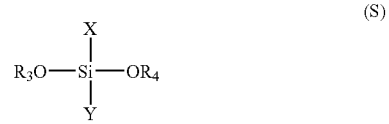

(S)

(wherein $R_3$ and $R_4$ represent alkyl group or phenyl group, X and Y represent hydrogen atom, optionally substituted alkyl group, optionally substituted phenyl group, optionally substituted alkoxy group, optionally substituted phenoxy group, optionally substituted aralkyl group, optionally substituted aralkyloxy group, vinyl group, vinyloxy group, 1,2-epoxycyclohexyl group, 1,2-epoxycyclohexyloxy group, styryl group, styryloxy group, methacryloyloxy group, amino group, ureido group, mercapto group or isocyanate group).

26 Claims, No Drawings

ADHESIVES AND OPTICAL LAMINATES INCLUDING THE SAME

FIELD OF THE INVENTION

The present invention relates to adhesives and optical laminates including the same.

DESCRIPTION OF THE RELATED ART

Liquid crystal cells generally applied to liquid crystal displays constituted with TFT or STN have a structure composed of a liquid crystal Component held between two glass substrates. On the surface of the glass substrate optical films such as polarizing films and retardation films are layered through adhesives mainly composed of acrylic resins. Optical laminates sequentially layered with a glass substrate, an adhesive and an optical film are generally produced by a method of layering an adhesive on an optical film to obtain an adhesive optical film, followed by layering a glass substrate on the adhesive surface thereof.

Such adhesive optical films are easily curled because of large dimensional changes caused by expansion and contraction thereof under heat or wet-heat conditions, resulting in problems of causing foaming in the adhesive layer of the optical laminate obtained, or blistering or peeling between the adhesive layer and the glass substrate. Furthermore, since residual stresses acting to adhesive optical films are unevenly distributed under heat or wet-heat conditions, stresses concentrate to periphery of the optical laminate, resulting in problems of causing white defects to TN liquid crystal cells (TFT) or color irregularity to STN liquid crystal cells.

It is also desired that, in order to re-layer the adhesive optical film, the surface of glass substrate having contacted to the adhesive layer is almost freed from clouding or glue residue after the adhesive optical film is peeled off from an optical laminate, i.e. so-called reworkability is enhanced. This, if the adhesive optical film once layered on an optical laminate is peeled off from the glass substrate thereof, enables to suppress causing glue residue or clouding on the surface of the glass substrate, and allows it to be re-used as a glass substrate.

Moreover, liquid crystal displays are currently used as in-car displays such as car navigation systems, this in-car applications require durability regarding to not causing appearance deterioration such as foaming, blistering, peeling or clouding under a high-temperature and high-humidity environment, To solve these problems, proposed is an adhesive mainly composed of a high-molecular weight acrylic resin having a weight-average molecular weight of 600,000 to 2,000,000 and a low-molecular weight acrylic resin having a weight-average molecular weight of 500,000 or less (JP-A 2000-109771).

SUMMARY OF THE INVENTION

The inventors of the invention have studied about properties of optical laminates layering an optical film with an adhesive mainly composed of an acrylic resin composition, thereby found that, when such optical laminates was subjected to a heat shock with the manner of setting a temperature change of from 60° C., −2° C. to 60° C. as one cycle (1 hour) and repeating this temperature cycle 100 times therefor, they often caused peelings or clouding on a surface of a glass plate thereof; resulting in insufficient durability.

The object of the invention is to provide an adhesive which has enhanced reworkability, suppresses causing white defects of an optical laminate as well as blistering or peeling between a glass substrate and an adhesive layer of the optical laminate and foaming in the adhesive layer thereof and also has enhanced durability without appearance changes such as white defects, blistering, peeling, foaming and clouding if being suffered to repeats of heating and cooling; an adhesive optical film including the adhesive, and an optical laminate layering an optical film with a glass substrate through the adhesive layer of the adhesive optical laminate.

The aspects of the invention are an adhesive including an acrylic resin (1), an acrylic resin (2), a silicone oligomer (3) and a crosslinking agent (4) described below; an adhesive optical film including layering the adhesive on any one or both of surface(s) of an optical film; and an optical laminate layering a glass substrate on the adhesive layer of the adhesive optical film.

The acrylic resin (1) includes a structural unit (a) derived from a monomer (A) and a structural unit (b) derived from a monomer (B) and has a weight-average molecular weight of 1,000,000 to 2,000,000, wherein the (A) is a (meth)acrylic ester represented by the formula (A)

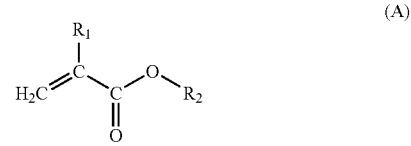

(wherein $R_1$ represents hydrogen atom or methyl group and $R_2$ represents alkyl or aralkyl groups having 1 to 14 carbon atoms wherein hydrogen atom(s) of the $R_2$ may be substituted with alkoxy group having 1 to 10 carbon atoms), and the (B) is at least any one of a (B-1) and a (B-2) wherein the (B-1) is a monomer including carboxyl group and one olefinic double bond, and the (B-2) is a monomer including at least one polar functional group selected from the group consisted of hydroxy group, amide group, amino group, epoxy group, oxetanyl group, aldehyde group and isocyanate group and an olefinic double bond.

The acrylic resin (2) includes the structural unit (a) and the structural unit (b) described above and has a weight-average molecular weight of 50,000 to 500,000.

The silicone oligomer (3) has 2 to 100 structural units (s) derived from a compound (S) represented as follows. The silicons oligomer (3) may contain two or more kinds of different structural units (s).

(wherein $R_3$ and $R_4$ represent alkyl group or phenyl group, X and Y represent hydrogen atom, optionally substituted alkyl group, optionally substituted phenyl group, optionally substituted alkoxy group, optionally substituted phenoxy group, optionally substituted aralkyl group, optionally substituted aralkyloxy group, vinyl group, vinyloxy group, 1,2-epoxycyclohexyl group, 1,2-epoxycyclohexyloxy group, styryl group, styryloxy group, methacryloyloxy group, amino group, ureido group, mercapto group or isocyanate group).

The adhesive of the invention has enhanced flexibility and adhesibility to optical films. The adhesive optical film layering an optical film with the adhesive provides the optical laminate of the invention, for example, by layering on a glass substrate of a liquid crystal cell. The optical laminate, since the adhesive layer thereof absorbs and relaxes stresses caused by dimension changes of an optical film or the glass substrate under wet-heat conditions, reduces locally concentrated stresses, thereby allows to suppress blistering or peeling respect to the glass substrate. Due to also suppressing optical defects caused by uneven stress distribution, when the glass substrate is a TN liquid crystal cell (TFT), causing white defects is suppressed. Furthermore, due to enhanced reworkability, if the adhesive optical film once layered is pealed off from the glass substrate of the optical laminate, causing glue residue or clouding on the surface of the gloss substrate after being pealed off is suppressed, thereby the glass substrate is allowed to be re-used as a glass substrate.

DETAILED DESCRIPTION OF PREFERRED EMBODIMENT

The invention is explained in detail as follows.

The acrylic resin (1) used in the invention is an acrylic resin which includes, as a major constituent, a structural unit (hereinafter, occasionally referred to as a structural unit (a)) derived from a (meth)acrylic ester (acrylic ester or methacrylic ester, this definition is same hereinafter) represented by the following formula (A) and, as a monomer (B) a monomer (B-1) including carboxyl group and one olefinic double bond and/or a monomer (B-2) including at least one polar functional group selected from the group consisted of hydroxy group, amide group, amino group, epoxy group, oxetanyl group, aldehyde group and isocyanate group and an olefinic double bond. Hereinafter, these are collectively called as a structural unit (b)

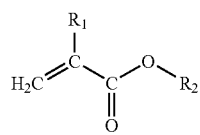

(A)

(wherein $R_1$ represents hydrogen atom or methyl group, and $R_2$ represents alkyl or aralkyl groups having 1 to 14 carbon atoms, preferably the alkyl group, wherein hydrogen atom(s) of the $R_2$ may be substituted with alkoxy group having 1 to 10 carbon atoms).

The (meth)acrylic ester represented by the formula (A) is exemplified by linear acrylic acid alkyl esters such as methylacrylate, ethylacrylate, propylacrylate n-butylacrylate, n-octylacrylate, laurylacrylate and stearylacrylate; branched acrylic acid alkyl esters such as iso-butylacrylate, 2-ethylhexylacrylate and iso-octylacrylate; linear methacrylic acid alkyl esters such as methylmethacrylate, ethylmethacrylate, propylmethacrylate, n-butylmethacrylate, n-octylmethacrylate, laurylmethacrylate and stearylmethacrylate; and branched methacrylic acid alkyl ester such as iso-butylmethacrylate, 2-ethylhexylmethacrylate and iso-octylmethacrylate.

The (meth)acrylic ester wherein hydrogen atom(s) of the $R_2$ is substituted with alkoxy group is exemplified by methoxyethylacrylate, ethoxymethylacrylate, methoxyethylmethacrylate and ethoxymethylmethacrylate.

The acrylic resin (1) may contain structural units derived from a plurality of different (meth)acrylic esters. Based on 100 parts by weight (nonvolatile content) of the acrylic resin (1), the structural unit (a) is contained usually 60 to 99.99 parts by weight, and preferably 80 to 99.6 parts by weight. The term of "nonvolatile content" used here is defined by a ratio of residue left after being heated at 120° C. for 1 hour, and, hereinafter, "weight part" is a weight part of the nonvolatile content except for being exceptionally defined.

The monomer (B) has an olefinic double bond, and preferably an aliphatic compound having olefinic double bond, The monomer (B-1) is exemplified by unsaturated carboxylic acids, and preferably by acrylic acid, methacrylic acid, maleic acid and itaconic acid. The example of the (B-2) having hydroxy group as a polar functional group includes aliphatic unsaturated alcohols optionally having another polar functional group. The aliphatic unsaturated alcohols used in the invention include, for example, 3-butene-1-ol, 3-butene-2-ol, 3-butene-1,2-diol, 2-methoxy-3-butene-1-ol, 2-butene-1,4-diol, 2-hydroxymethylbutadiene, dimethylvinylcarbinol, 2-methoxy-2-methyl-3-butene-1-ol, 3-vinyl-4-pentene-1-ol, crotyl alcohol and methallyl alcohol. Of these, preferable are compounds that an alcohol residue of unsaturated carboxylic acid ester has hydroxy group, and more preferable are compounds that an alcohol residue of acrylic ester or methacrylic ester has hydroxy group, for example, including 2-hydroxyethyl(meth)acrylate, 2-hydroxypropyl(meth)acrylate and 4-hydroxybutyl(meth)acrylate. The example having amide group as a polar functional group includes aliphatic unsaturated acid amide compounds optionally having another polar functional group and N-substitution products thereof, and N-alkenyl-substituted carboxylic acid amide. The aliphatic unsaturated acid amide compounds used in the invention include N-allylacetamide, N-allylbarbituric acid, N-allylcrotonic acid amide, N-allylstearic acid amide and the like. Of these, preferable are unsaturated acid amide compounds, and more preferable are acrylic acid amide or methacrylic acid ester amide, for example, including acrylamide, methacrylamide, N,N-dimethylaminopropylacrylamide, diacetonediamide, N,N-dimethylacrylamide, N,N-diethylacrylamide and N-methylolacrylamide. The example of monomer having epoxy group as a polar functional group includes compounds that an alcohol residue of aliphatic unsaturated ester optionally having another polar functional group has epoxy group, and compounds that an alcohol residue of epoxycarboxylic acid ester has olefinic double bond. The compounds that an alcohol residue of unsaturated ester has epoxy group, being used in the invention, include isopreneoxide, diallylglycidylamine and the like. Of these, preferable are compounds that an alcohol residue of aliphatic unsaturated carboxylic acid ester has epoxy group, and more preferable are compounds that an alcohol residue of acrylic easter or methacrylic ester has epoxy group, for example, including glycidylacrylate and glycidylmethacrylate. The example having oxetanyl group as a polar functional group includes compounds that an alcohol residue of aliphatic unsaturated ester optionally having another polar functional group has oxetanyl group and compounds that an alcohol residue of oxetanylcarboxylic acid ester has olefinic double bond. Of these, preferable are compounds that an alcohol residue of aliphatic unsaturated carboxylic acid ester has oxetanyl groups and more preferable are compounds that an alcohol residue of acrylic ester or methacrylic ester has oxetanyl group, for examples including oxetanyl(meth)acrylate, 3-oxetanylmethyl(meth) acrylate, (3-methyl-3-oxetanyl)methyl(meth)acrylate and (3-ethyl-3-oxetanyl)methyl(meth)acrylate. The example having amino group as a polar functional group includes aliphatic unsaturated amines optionally having another polar functional group, N-substituted aliphatic unsaturated amines, compounds that an alcohol residue of aminocarboxylic acid ester has olefinic double bond and N-substitution products thereof, and compounds that an alcohol residue of unsaturated carboxylic acid ester has amino group and N-substitution products thereof. The aliphatic unsaturated amines used in the invention include monoallylamine, diallylamine, N,N-dimethylallylamine, N,N-diethylallylamine, N,N'-diallylpiperazine, methylallyl3-methoxypropylamine, N-ethyldiallylamine, methallylamine, dimethallylamine, N-vinyldiethylamine and the like. Of these, preferable are compounds that an alcohol residue of unsaturated carboxylic acid ester has amino group, and more preferable are compounds that an alcohol reside of acrylic ester or methacrylic ester has amino group, for examples including N,N-dimethylaminoethylacrylate and allylamine. The example having isocyanate group as a polar functional group includes aliphatic unsaturated cyano compounds optionally having another polar functional group, compounds that an alcohol residue of cyanocarboxylic acid ester has olefinic double bond, and compounds that an alcohol residue of unsaturated carboxylic acid ester has cyano group. The aliphatic unsaturated cyano compounds used in the invention include allyl cyanide, acroleincyanohydrin, methacroleincyanohydrin, 2-hydroxy-3-butene cyanide, diallylacetonitrile and the like. Of these, preferable are compounds that an alcohol residue of aliphatic unsaturated carboxylic acid ester has cyano group, more preferable are compounds that an alcohol residue of acrylic ester or methacrylic ester has cyano group, for example, including 2-methacryloyloxyethylisocyanate and the like. The example having aldehyde group as a polar functional group includes aliphatic unsaturated aldehyde compounds optionally having another polar functional group, compounds that an alcohol residue of carboxylic acid ester having aldehyde group has olefinic double bond and compounds that an alcohol residue of unsaturated carboxylic acid ester has aldehyde group. The aliphatic unsaturated aldehyde compounds used in the invention include, for example, acrylaldehyd. The monomer (B) may use two or more kinds of different monomers (B) thereof in combination.

Furthermore, monomers mentioned above may use a plurality of kinds thereof.

The monomer (B) is preferably the above-mentioned (B-1) or (B-2) having hydroxy group as polar functional group, and more preferably 4-hydroxybutyl(meth)acrylate, acrylic acid and 2-hydroxyethyl(meth)acrylate.

Content of the structural unit (b) in the acrylic resin (1) is, base on 100 parts by weight of the acrylic resin (1), usually in the order of 0.01 to 40 parts by weight, and preferably 0.4 to 20 parts by weight. It is preferable that, if the content of the structural unit (b) is 20 or less parts by weight, causing blistering or peeling between a glass substrate and an adhesive layer is suppressed.

Molecular weight of the acrylic resin (1) is a polystyrene-reduced weight-average molecular weight (Mw) of 1,000,000 to 2,000,000 determined by a gel permeation chromatography (GPC). It is preferable that, if the weight-average molecular weight is 1,000,000 or more, adhesibility is enhanced even under high temperature and high humidity conditions and causing blistering or peeling between a glass substrate and an adhesive layer is reduced while reworkability is enhanced. It is preferable that, if the weight-average molecular weight is 2,000,000 or less, an adhesive layer varies following to dimension change of an optical film and this allows to reduce difference of luminances between periphery and center of a liquid crystal cell, thereby to suppress causing white defects and color irregularity.

Methods for producing the acrylic resin (1) include, for example, solution polymerization, emulsion polymerization, bulk polymerization and suspension polymerization; of these, preferable is solution polymerization.

Specific example of the solution polymerization includes a method of mixing a desired monomer and organic solvent to prepare a mixture having a monomer concentration of 50% or more by weight, and preferably 50% to 60% by weight, adding a polymerization initiator in the order of 0.001 to 0.1 parts by weight under a nitrogen atmosphere, and then agitating the mixture at in the order of 40 to 90° C. and preferably in the order of 50 to 70° C. for 8 or more hours, and preferably in the order of 8 to 12 hours.

The polymerization initiator is exemplified by thermal polymerization initiators and photoinitiators; the photoinitiators include, for example, 4-(2-hydroxyethoxy)phenyl(2-hydroxy-2-propyl)ketone. The thermal polymerization initiators include, for example, azo-based compounds such as 2,2'-azobisisobutyronitrile, 2,2'-azobis(2-methylbutyronitrile), 1,1'-azobis(cyclohexane-1-carbonitrile), 2,2'-azobis(2,4-dimethylvaleronitrile), 2,2'-azobis(2,4-dimethyl-4-methoxyvaleronitrile), dimethyl-2,2'-azobis(2-methylpropionate) and 2,2'-azobis(2-hydroxymethylpropionitrile); organic peroxides such as laurylperoxide, tert-butylhydroperoxide, benzoylperoxide, tert-butylperoxybenzoate, cumenehydroperoxide, dipropylperoxydicarbonate, di-n-propylperoxydicarbonate tert-butylperoxyneodecanoate, tert-butylperoxypiparate, (3,5,5-trimethylhexanoyl) and peroxyde; and inorganic peroxides such as potassium persulfate, ammonium persulfate and hydrogen peroxide. Alternatively, redox-base initiators using a thermal polymerization initiator together with a reducing agent may be used as polymerization initiators, The organic solvent includes, for example, aromatic hydrocarbons such as toluene and xylene; esters such as ethyl acetate and butyl acetate; aliphatic alcohols such as n-propylalcohol and iso-propylalcohol; and ketones such as acetone, methylethylketone and methylisobutylketone.

The acrylic resin (2) is an acrylic resin including the structural unit (a) and the structural unit (b) and having a weight-average molecular weight of 50,000 to 500,000.

Content of the structural unit (b) in the acrylic resin (2) is, base on 100 parts by weight of the acrylic resin (2), usually in the order of 0.05 to 20 parts by weight, and preferably 0.1 to 15 parts by weight. It is preferable that, if the content of the structural unit (b) is 0.05 or more parts by weight, coagulating ability of the adhesive obtained is enhanced, and if being 20 or less parts by weight, causing blistering or peeling between a glass substrate and an adhesive layer is suppressed.

Molecular weight of the acrylic resin (2) is usually a polystyrene-reduced weight-average molecular weight of 50,000 to 500,000 determined by a gel permeation chromatography (GPC). It is preferable that, if the weight average molecular weight is 50,000 or more, adhesibility is enhanced even under high temperature and high humidity conditions and causing blistering or peeling between a glass substrate and an adhesive layer is reduced while reworkability is enhanced, and that, if the weight-average molecular weight is 500,000or less, an adhesive layer varies following to dimension change of an optical film and this allows to reduce difference of luminances between periphery and center of a liquid crystal cell, thereby to suppress causing white defects and color irregularity.

Methods for producing the acrylic resin (2) include, for example, solution polymerization, emulsion polymerization, bulk polymerization and suspension polymerization.

Polymerization initiator is usually used for producing the acrylic resin (2). The polymerization initiator, based on 100 parts by weight of total monomers applied to the production of the acrylic resin, is used in the order of 0.1 to 5 parts by weight, and preferably in the order of 0.2 to 3 parts by weight, The solution polymerization is particularly preferable for producing the acrylic resin (2). Specific example of the solution polymerization includes a method of mixing a desired monomer and organic solvent to prepare a mixture, adding a polymerization initiator under a nitrogen atmosphere, and then agitating the mixture at in the order of 40 to 90° C., preferably in the order of 60 to 80° C. for in the order of 3 to 10 hours. In order to control the reaction, the monomer or polymerization initiator to be used may be added as themselves in the course of polymerization or as a form dissolved with an organic solvent.

The polymerization initiator and organic solvent to bet used for acrylic resin (2) production are exemplified by the same to be applied to the acrylic resin (1) production.

The acrylic resin (1) and/or (2), preferably the acrylic resin (1), may further contain a repeating unit derived from a monomer (C) mentioned below. The monomer (C) to be used includes, for example, a monomer that heterocyclic group such as 2,5-dihydrofuran has olefinic double bond, a monomer that an alcohol residue of unsaturated carboxylic acid ester has at least one 5- or more membered heterocyclic group, and N-substituted heterocyclic group of which substitution group has unsaturated bond. The "at least one 5- or more membered heterocyclic group" is defined by a group wherein at least one methylene group of an alicyclic hydrocarbon group membered with 5 or more carbon atoms, and preferably 5 to 7 carbon atoms is replaced with a heteroatom such as nitrogen, oxygen or sulfur atoms.

Preferable monomer (C) is a compound having acrylic acid or methacrylic acid as unsaturated carboxylic acid thereof, or a cyclic acid amide compound, for example, including N-vinyl-3-morpholine, acryloylmorpholine, vinylcaprolactam, N-vinyl-2-pyrrolidone, N-vinyl-3-methylpyrrolidone, tetrahydrofurfurylacrylate, tetrahydrofurfurylmethacrylate and caprolactone modified tetrahydrofurfurylacrylate. The monomer (C) may use two or more kinds of different monomers (C) thereof.

Of these, the monomer (C) is preferably N-vinylpyrrolidone, vinylcaprolactam and acryloylmorpholine and a mixture thereof.

Content of the structural unit (structural unit (c)) derived from the monomer (C) contained in the acrylic resin (1) and/or (2) of the invention is, base on 100 parts by weight of the acrylic resin (1) or (2), usually in the order of 0.1 to 30 parts by weight, and preferably in the order of 0.1 to 20 parts by weight. It is preferable that, if the content of the structural unit (c) is 0.1 or more parts by weight, an adhesive layer varies following to dimension change of an optical film and this allows to reduce difference of luminances between periphery and center of a liquid crystal cell, thereby to suppress causing white defects and color irregularity, and that, if being 30 or less parts by weight, causing blistering or peeling between a glass substrate and an adhesive layer is suppressed.

The acrylic resin (1) and/or (2), preferably acrylic resin (1), may further contain a repeating unit derived from a monomer (D) of which molecule includes at least two olefinic double bonds. The presence of this monomer (D) allows to crosslink a main chain of the acrylic resin composed of the structural unit (a) and the like. Examples of the monomer (D) includes a monomer containing two olefinic double bonds in the molecule thereof (bifunctional monomer) including (meth)acrylates such as ethyleneglycoldi(meth)acrylate and diethyleneglycoldi(meth)acrylate, bis(meth)acrylamides such as methylenebis(meth)acrylamide and ethylenebis(meth)acrylamide, divinylesters such as adipicaciddivinyl and sebacicaciddivinyl, allylmethacrylate and divinylbenzene; a monomer containing three olefinic double bonds in the molecule thereof (trifunctional vinyl monomer) including 1,3,5-triacryloylhexahydro-S-triazine, triallylisocyanurate, triallylamine and N,N-diallylacrylamide; and a monomer containing four olefinic double bonds in the molecule thereof (tetrafunctional vinyl monomer) including tetramethylolmethanetetraacrylate, tetraallylpyromellitate, N,N,N',N'-tetraallyl-1,4-diaminobutane and tetraallyl ammonium salt. The monomer (D) may use two or more kinds of different monomers (D) thereof.

Of the monomer (D), preferable is a monomer having two (meth)acryloyl groups represented by the formula (D) in the molecule thereof.

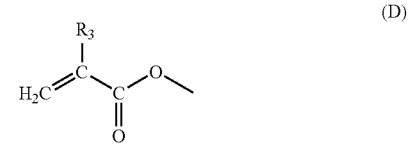

(wherein $R_3$ represents hydrogen atom or methyl group)

Content ([d-1]) of the structural unit (d) derived from the monomer (D) contained in the acrylic resin (1) is, based on 100 parts by weight of whole structural Units composing the acrylic resin (1), 0.05 to 5 parts by weight, and preferably in the order of 0.1 to 3 parts by weight. It is preferable that, if [d-1] is 0.05 or more parts by weight, an adhesive layer varies following to dimension change of an optical film and this allows to reduce difference of luminances between periphery and center of a liquid crystal cell, thereby to suppress causing white detects and color irregularity, and that, if being 5 or less parts by weight, generation of gels is suppressed in the course of producing the acrylic resin.

The acrylic resin (1) and/or (2), preferably acrylic resin (1), may also further contain a repeating unit derived from a monomer (E) in which an alcohol residue of acrylic ester or methacrylic ester includes olefinic double bond and at least one alicyclic structure. The alicyclic structure is defined by cycloparaffine or cycloolefin structures usually having 5 or more carbon atoms, and preferably in the order of 5 to 7 carbon atoms, and the cycloolefin structure contains olefinic double bond in the alicyclic structure thereof. Specifically, the acrylic acid esters having alicyclic structure include acrylic acid isobornyl, acrylic acid cyclohexyl, acrylic acid dicyclopentanyl, acrylic acid cyclododecyl, methylcyclohexyl acrylate, trimethylcyclohexyl acrylate, acrylic acid tert-butylcyclohexyl, cyclohexyl α ethoxy acrylate and cyclohexylphenyl acrylate; and the methacrylic acid esters having alicyclic structure include, for example, methacrylic acid isobornyl, methacrylic acid cyclohexyl, methacrylic acid dicyclopentanyl, methacrylic acid cyclododecyl, methylcyclohexyl methacrylate, trimethylcyclohexyl methacrylate, methacrylic acid tert-butylcyclohexyl, cyclohexyl α ethoxy methacrylate and cyclohexylphenylmethacrylate. The acrylates having a plurality of alicyclic structures include biscyclohexylmethyl itaconate, dicyclooctyl itaconate, dicyclododecylmethyl succinate and the like; and vinyl cyclohexyl acetate having vinyl group and the like are also included in the monomer (E).

The monomer (E) may use two or more kinds of different monomers (E) thereof in combination.

When using a monomer (E) for the acrylic resin (1), content of the structural unit (e) derived from the monomer (E) contained in the acrylic resin (1) is, base on 100 parts by weight of the acrylic resin (1), usually in the order of 0.1 to 30 parts by weight, and preferably in the order of 1 to 15 parts by weight. It is preferable that, it the content of the structural unit (e) is 0.1 or more parts by weight, causing blistering or peeling between a glass substrate and an adhesive layer is suppressed, and that, if being 30 or less parts by weight, an adhesive layer varies following to dimension change of an optical film and this allows to reduce difference of luminances between periphery and center of a liquid crystal cell, thereby to suppress causing white defects and color irregularity.

As the monomer (E), due to easiness of commercial availability, preferable are acrylic acid isobornyl, acrylic acid cyclohexyl, methacrylic acid isobornyl, methacrylic acid cyclohexyl and acrylic acid dicyclopentanylpentanyl.

When the acrylic resin (1) and/or (2) used in the invention are produced, they may be polymerized together with a vinyl-based monomer (F) different from any of the monomers (A) to (E) The vinyl-based monomer includes, for example, fatty acid vinyl esters, halogenated vinyls, halogenated vinylidenes, aromatic vinyls, (meth)acrylonitriles and conjugated diene compounds.

The fatty acid vinyl esters includes, for example, vinyl acetate, vinyl propionate, vinyl butyrate, vinyl 2-ethylhexanoate and vinyl laurate. The halogenated vinyls are exemplified by vinyl chloride and vinyl bromide; the halogenated vinylidenes are exemplified by vinylidene chloride; and the (meth)acrylonitriles are exemplified by acrylonitrile and methacrylonitrile. The conjugated diene compounds are olefins having conjugated double bond in the molecule thereof, and specifically including isoprene, butadiene and chloroprene. The aromatic vinyls are compounds having vinyl group and aromatic group, and specifically including styrenic monomers such as styrene, methylstyrene, dimethyl styrene, trimethylstyrene, ethylstyrene, diethylstyrene, trimethylstyrene, propylstyrene, butylstyrene, hexylstyrene, heptylstyrene, octylstyrene, florostyrene, chlorostyrene, bromostyrene, dibromostyrene, iodostyrene, nitrostyrene, acetylstyrene and methoxystyrene; and nitrogen-contained aromatic vinyls such as vinylpyridine an d vinylcarbazol. The vinyl-based monomer (F) may use two or more kinds of different vinyl-based monomers (F) thereof in combination.

The structural unit (f) derived from the monomer (F) to be contained in the acrylic resin (1) is, base on 100 parts by weight of whole structural units composing the acrylic resin (1), 5 or less parts by weight, preferably 0.05 or less parts by weight, and more preferably substantially not being contained. The structural unit (f) to be contained in the acrylic resin (2) is, base on 100 parts by weight of whole structural units composing the acrylic resin (2), 5 or less parts by weight, preferably 0.05 or less parts by weight, and more preferably substantially not being contained.

The adhesive of the invention is a resin composition including above mentioned acrylic resin (1) and above mentioned acrylic resin (2); and it is usually produced by producing the acrylic resin (1) and the acrylic resin (2) respectively, followed by mixing both of them; as alternative, it may be produced by producing any one of the acrylic resin (1) and the acrylic resin (2), followed by producing the rest of acrylic resin in the presence of the acrylic resin produced beforehand Also alternative, it may be produced by mixing the acrylic resin (1) and the acrylic resin (2), followed by dilution of the mixture with an organic solvent Regarding to weight ratio (nonvolatile content) of the acrylic resin (1) and the acrylic resin (2), based on 100 parts by weight of sum of the acrylic resin (1) and the acrylic resin (2), an amount of the acrylic resin (1) is usually 40 to 100 parts by weight, and preferably in the order of 50 to 70 parts by weight. It is preferable that, if the acrylic resin (1) amount is 10 or more parts by weight, an adhesive layer varies following to dimension change of an optical film and this allows to reduce difference of luminances between periphery and center of a liquid crystal call, thereby to suppress causing white defects and color irregularity, and that, if the acrylic resin (2) amount is 50 or less parts by weight, adhesibility is enhanced even under high temperature and high humidity conditions and causing blistering or peeling between a glass substrate and an adhesive layer is reduced while reworkability is enhanced.

Viscosity of a solution (25° C. in which a nonvolatile content of a mixture composed only of the acrylic resin (1) and (2) is adjusted to 20% with ethylacetate is usually 10 or less Pa·s, and preferably 0.1 to 7 Pa·s. It is preferable that, if the viscosity is 10 or less Pa·s, adhesibility is enhanced even tinder high temperature and high humidity conditions and causing blistering or peeling between a glass substrate and an adhesive layer is reduced while reworkability is enhanced.

The silicone oligomer (3) used in the invention is an oligomer having 2 to 100 structural units (s) derived from a compound (S) mentioned below, which is usually being polymerized with silicon atoms through oxygen atom.

The silicone oligomer (3) is a silicone oligomer obtained by condensing alkoxy groups (or phenoxy groups) represented by —$OR_3$ and —$OR_4$ or hydroxy groups produced by hydrolysis of —$OR_3$ and —$OR_4$. It is preferable that such oligomer, i.e. the silicone oligomer (3), hardly litters during steps of coating and drying the adhesive.

(S)

wherein $R_3$ and $R_4$ represent alkyl group or phenyl group. $R_3$ and $R_4$ usually have in the order of 1 to 10 carbon atoms respectively.

X and Y represent hydrogen atom, optionally substituted alkyl group, optionally substituted phenyl group, optionally substituted alkoxy group, optionally substituted phenoxy group, optionally substituted aralkyl group, optionally substituted aralkyloxy group, vinyl group, vinyloxy group, 1,2-epoxycyclohexyl group, 1,2-epoxycyclohexyloxy group, styryl group, styryloxy group, methacryloyloxy group, amino group, ureido group, mercapto group or isocyanate group.

Groups to be substituted include phenyl group, alkoxy group, phenoxy group, aralkyl group, vinyl group, vinyloxy group, 1,2-epoxycyclohexyl group, 1,2-epoxycyclohexyloxy group, styryl group, styryloxy group, methacryloyloxy group, amino group, ureido group, mercapto group, isocyanate group and the like.

X and Y usually have in the order of 1 to 10 carbon atoms respectively.

The silicone oligomer (3) may include two or more kinds of different structural units (s), and preferable is a silicone oligomer (3) containing a structural unit (s) of which $R_3$ and/or $R_4$ are ethyl group.

It is preferable that a silicone oligomer (3) containing structural units (s) derived from the following compound (S1) and the following compound (S2):

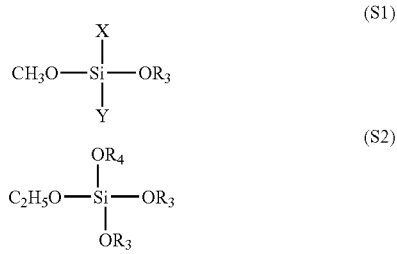

(wherein $R_3$, $R_4$, X and Y have the same meaning defined above).

As alternative, it is preferable that, when using a silicone oligomer (3) containing a structural unit derived from the following compound (S3) having mercapto group and a structural unit derived from the following compound (S4), adhesibility of an adhesive obtained is enhanced even under high temperature and high humidity conditions and causing blistering or peeling between a glass substrate and an adhesive layer is reduced while reworkability is enhanced;

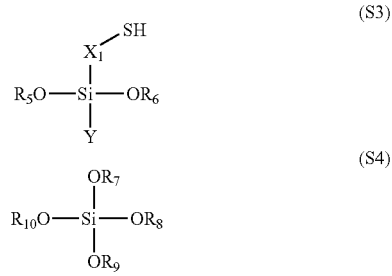

(wherein $R_5$ to $R_{10}$ each independently represent alkyl group or phenyl group, $X_1$ represents alkylene group having 1 to 10 carbon atoms and Y has the same meaning defined above).

It is preferable that using a silicone oligomer obtained by applying compounds of which $R_5$ to $R_{10}$ are methyl group and/or ethyl group reduces causing blistering or peeling between a glass substrate and an adhesive layer of an optical laminate even if subjected to heatshock, and more preferable using a silicone oligomer (3) obtained by applying compounds having methyoxy group and ethoxy group.

As mentioned above, since the silicone oligomer is a silicone oligomer obtained by condensing alkoxy groups (or phenoxy groups) or hydroxy groups produced by hydrolysis thereof, the alkoxy group is occasionally left in the silicone oligomer. The silicone oligomer used in the invention is preferably such silicone oligomer leaving the alkoxy group therein; for example, when using above mentioned (S1) to (S4) more preferable is a silicone oligomer (3) having mercapto group, methoxy group and ethoxy group.

The compound (S) includes, for example, compounds having mercapto group such as γ-mercaptopropyltrimethoxysilane, γ-mercaptopropyltriethoxysilane γ-mercaptopropylmethyldimethoxysilane, γ-mercaptopropylmethyldiethoxysilane, β-mercaptomethylphenylethyltrimethoxysilane, mercaptomethyltrimethoxysilane, 6-mercaptohexyltrimethoxysilane and 10-mercaptodecyltrimethoxysilane; for example, silane compounds having any two of methacryloxy group, alkyl group and alkoxy group such as γ-methacryloxypropyltrimethoxysilane, γ-methacryloxypropyltriethoxysilane, γ-methacryloxypropyltributoxysilane, γ-methacryloxypropylmethyldimethoxysilane and γ-methacryloxypropylmethyldiethoxysilane; for example, silane compounds having any two of acryloxy group, alkyl group and alkoxy group such as γ-acryloxypropyltrimethoxysilane, γ-acryloxypropyltriethoxysilane and γ-acryloxypropylmethyldimethoxysilane; for example, silane compounds having any three of (meth)acryloxyalxyl group and alkoxy group such as γ-methdacryloxymethyltrimethoxysilane and γ-acryloxymethyltrimethoxysilane; for example, alkoxysilanes having vinyl group such as vinyltrimethoxysilane, vinyltriethoxysilane, vinyltributoxysilane and vinylmethyldimethoxysilane; for example, alkoxysilanes having alkyl group such as 5-hexenyltrimethoxysilane, 9-decenyltrimethoxysilane and styryltrimethoxysilane; for examples silanes having aminoalkyl group and alkoxy group such as γ-aminopropyltrimethoxysilane, γ-aminopropyltriethoxysilane, γ-aminopropylmethyldimethoxysilane and γ-aminopropylmethyldiethoxysilane; for example, tetraalkoxysilanes such as tetramethoxysilane, tetraethoxysilane, tetrapropoxysilane and tetrabutoxysilane; and, for example, 3-glycidoxypropyltrimethoxysilane, 3-glycidoxypropylmethyldimethoxysilane, 2-(3,4-epoxycyclohexyl)ethyltrimethoxysilane, 3-chloropropylmethyldimethoxysilane, 3-chloropropyltrimethoxysilane, phenyltrimethoxysilane, hexamethylsilazane, diphenyldimethoxysilane 1,3,5-tri-(3-trimethoxysilylpropyl)isocyanurate, vinyltris(2-methoxyethoxy)silane, N-(2-aminoethyl)-3-aminopropyldimethoxysilane and N-(2-aminoethyl)-3-aminopropyltrimethoxysilane.

Of these, preferable is a silicone oligomer (3) containing structural units derived from γ-mercaptopropyltrimethoxysilane and from tetraethoxysilane.

The silicone oligomer (3) of the invention expressed in a form of (monomer)oligomer includes, for example, copolymers containing mercaptopropyl group such as 3-mercaptopropyltrimethoxysilane-tetramethoxysilane copolymer, 3-mercaptopropyltrimethoxysilane-tetraethoxysilane copolymer, 3-mercaptopropyltriethoxysilane-tetramethoxysilane copolymer and 3-mercaptopropyltriethoxysilane-tetraethoxysilane copolymer; copolymers containing mercaptomethyl group such as mercaptomethyltrimethoxysilane-tetramethoxysilane copolymer, mercaptomethyltrimethoxysilane-tetraethoxysilane copolymer, mercaptomethyltriethoxysilane-tetramethoxysilane copolymer and mercaptomethyltriethoxysilane-tetraethoxysilane copolymer, copolymers containing methacryloxypropyl group such as 3-methacryloxypropyltrimethoxysilane-tetramethoxy-silane copolymer, 3-methacryloxypropyltrimethoxysilane-tetraethoxy-silane copolymer, 3-methacryloxypropyltriethoxysilane-tetraethoxy-silane copolymer, 3-methacryloxypropyltriethoxysilane-tetraethoxy-silane copolymer, 3-methacryloxypropylmethyldimethoxysilane-tetra-methoxysilane copolymer, 3-methacryloxypropylmethyldimethoxysilane-tetra-ethoxysilane copolymer, 3-methacryloxypropylmethyldiethoxysilane-tetra-methoxysilane copolymer and 3-methacryloxypropylmethyldiethoxysilane-tetra-ethoxysilane copolymer; copolymers containing acryloxypropyl group such as 3-acryloxypropyltrimethoxysilane-tetramethoxysilane copolymer, 3-acryloxypropyltrimethoxysilane-tetraethoxysilane copolymer, 3-acryloxypropyltriethoxysilane-tetramethoxysilane copolymer, 3-acryloxypropyltriethoxysilane-tetraethoxysilane copolymer, 3-acryloxypropylmethyldimethoxysilane-tetramethoxy-silane copolymer, 3-acryloxypropylmethyldimethoxysilane-tetraethoxy-silane copolymer, 3-acryloxypropylmethyldimethoxysilane-tetraethoxy-silane copolymer and 3-acryloxypropylmethyldiethoxysilane-tetraethoxy-silane copolymer; copolymers containing vinyl group such as vinyltrimethoxysilane-tetramethoxysilane copolymer, vinyltrimethoxysilane-tetraethoxysilane copolymer, vinyltriethoxysilane-tetramethoxysilane copolymer, vinyltriethoxysilane-tetraethoxysilane copolymer, vinylmethyldimethoxysilane-tetramethoxysilane copolymer, vinylmethyldimethoxysilane-tetraethoxysilane copolymer, vinylmethyldiethoxysilane-tetramethoxysilane copolymer and vinylmethyldiethoxysilane-tetraethoxysilane copolymer; and copolymers containing amino group such as 3-aminopropyltrimethoxysilane-tetramethoxysilane copolymer, 3-aminopropyltrimethoxysilane-tetraethoxysilane copolymer, 3-aminopropyltriethoxysilane-tetramethoxysilane copolymer, 3-aminopropyltriethoxysilane-tetraethoxysilane copolymer, 3-aminopropylmethyldimethoxysilane-tetramethoxy-silane copolymer, 3-aminopropylmethyldimethoxysilane-tetraethoxy-silane copolymer, 3-aminopropylmethyldiethoxysilane-tetramethoxy-silane copolymer and 3-aminopropylmethyldiethoxysilane-tetraethoxysilane copolymer.

The silicone oligomer (3) is used, base on 100 parts by weight of total nonvolatile content of the acrylic resin (1) and (2), usually in the amount of in the order of 0.001 to 5 parts by weight, and preferably 0.05 to 3 parts by weight. It is preferable that, if the amount of silicone oligomer (3) is 0.001 or more parts by weight adhesibility with a glass substrate is enhanced. It is also preferable that, if the amount of silicone oligomer (3) is 5 or less parts by weight, bleeding or the silicone oligomer (3) out of an adhesive layer is suppressed. It is also preferable that, if the silicone oligomer (3) is used in the amount of 0.001 or more parts by weight, both of durability and ability of anti-white defects are enhanced; and that, if being used 5 or less parts by weight, bleeding of the silicone oligomer (3) out on a surface of an adhesive layer is suppressed.

The crosslinking agent used in the invention is a compound having, in the molecule thereof, at least two functional groups capable of crosslinking with the structural unit (b), and being specifically exemplified by isocyanate-based compounds, epoxy-based compounds, metal chelate-based compounds and aziridine-based compounds.

The isocyanate-based compounds include, for example, thrylenediisocyanate, hexamethylenediisocyanate, isophoronediisocyanate, xylylenediisocyanate, hydrogenated xylylenediisocyanate, diphenylmethanediisocyanate, hydrogenated diphenylmethanediisocyanate, tetramethylxylylenediisocyanate, naphthalenediisocyanate, triphenylmethanetriisocyanate and polymethylenepolyphenylisocyanate. Furthermore, adduct products in which the above mentioned isocyanate compounds are subjected to reaction with polyols such as glycerol and trimethylolpropane, and dimers or trimers of the isocyanate compounds are also included in the crosslinking agent used for an adhesive layer.

The isocyanate-base compounds may use a mixture of different isocyanate-based compounds thereof.

The epoxy-based compounds include, for example, bispenol A-type epoxy resin, ethyleneglycolglycidyl ether, polyethyleneglycoldiglycidyl ether, glycerindiglycidyl ethers glycerintriglycidyl ether, 1,6-hexandioldiglycidyl ether, trimethylolpropanetriglycidyl ether, diglycidylaniline, N,N,N',N'-tetraglycidyl-m-xylenediamine and 1,3-bis(N,N'-diglycidylaminomethyl)cyclohexane.

The epoxy-based compounds may use a mixture of different epoxy-based compounds thereof, The metal chelate-based compounds include, for example, compounds of polyvalent metals coordinated with acetyl acetone or ethyl acetoacetate, the polyvalent metals being such as aluminum, iron, copper, zinc, tin, titanium, nickel, antimony, magnesium, vanadium, chromium and zirconium, The aziridine-based compounds include, for example, N,N'-diphenylmethane-4,4'-bis(1-aziridinecarboxide), N,N'-toluene-2,4-bis(1-aziridinecarboxamide), triethylenemelamine, bisisophthaloyl-1-(2-methylaziridine), tri-1-aziridinylphosphineoxide, N,N'-hexamethylene-1,6-bis(1-aziridinecarboxide), trimethylolpropane-tri-$\beta$-aziridinylpropionate and tetramethylolmethane-tri-$\beta$-aziridinylpropionate.

Of these, the crosslinking agents include xylylenediisocyanate or thrylenediisocyanate, adduct products subjecting above-mentioned isocyanate compounds to reaction with polyols such as glycerol and trimethylolpropane and mixtures of dimmers, trimers and the like of isocyanate compounds, and mixtures of different isocyanate-based compounds mentioned above, and the like.

Amount of the crosslinking agent contained in the adhesive of the invention is, based on 100 parts by weight of the acrylic resin (1) 0.001 to 10 parts by weight, and preferably 0.1 to 5 parts by weight.

It is preferable that, if the amount of the crosslinking agent is 0.01 or more parts by weight, durability is enhanced, and that, if being 10 or less parts by weight, white defects of the optical laminate becomes unnoticeable.

The adhesive of the invention may further contain crosslinking catalysts, weathering stabilizers, tackifiers, plasticizers, softening agents, dyes, pigments, inorganic fillers and the like.

Particularly, containing a crosslinking catalyst and crosslinking agent in the adhesive may allow to prepare an adhesive layer by short maturing time, and, regarding to an optical laminate, allow to suppress causing blistering or peeling between an optical film and an adhesive layer and foaming in an adhesive layer while to enhance reworkability.

The crosslinking catalyst includes, for example, amine-based compound such as hexamethylenediamine, ethylenediamine, polyethyleneimine, hexamethylenetetramine, diethylenetriamine, triethylenetetramine, isophoronediamine, triethylenediamine, polyamino resins and melamine resins. When using amine compounds to the adhesive as a cross linking catalyst, preferable crosslinking agent is isocyanate-based compounds.

The optical film used for the adhesive optical film of the invention is a film having optical characteristics, for example, including polarizing films and retardation films. The polarizing film is an optical film having a function to radiate polarized light respect to incident light such as natural light The polarizing film includes a linearly polarizing film which has characteristics absorbing a linearly polarized light having a vibration face parallel to an optical axis and transmitting a linearly polarized light having a vibration face perpendicular thereto, a polarized light separation film reflecting a linearly polarized light having a vibration face parallel to an optical axis and an elliptic polarizing film laminating a polarizing film with a retardation film described below. Specific example of the polarizing films includes mono-oriented polyvinyl alcohol in which dichromatic colorants such as iodine and dichromatic dyes are absorbed and aligned.

The retardation film is an optical film having mono- or biaxial optical anisotropy, for example, including oriented films obtained by stretching polymer films in 1.01 to 6 times, said polymer films being composed of polyvinylalcohols, polycarbonates, polyesters, polyarylates, polyimide, polyolefins, polystyrenes, polysulfones, polyethersulfones, polyvinylidenefluoride/polymethylmethacrylates, liquid crystal polyesters, acetylcelluloses, cyclic polyolefins, ethylene-vinylacetate copolymer saponified resins, polyvinylchlorides or the like, of these, preferable are polymer films of mono- or biaxialy orienting polycarbonates or polyvinylalcohols.

The retardation film includes uniaxial retardation films, wide-view-angle retardation films, low photoelastic modulus retardation films, temperature-compensation retardation films, LC films (rod-like liquid crystals having twist angle), WV films (discotic liquid crystals having oblique alignment), NH films (rod-like liquid crystals having oblique alignment), VAC films (completely biaxially oriented retardation films), newVAC films (biaxially oriented retardation films) and the like.

Films of the above-mentioned optical films further affixed with a protective film may be optical films and layered with the adhesive of the invention. The protective film includes, for example, films of acrylic resin other than the acrylic resin of the invention, acetylcellulose-based films such as triacetic acid-cellulose films, polyester resin films, olefin resin films, polycarbonate resin films, polyetheretherketone resin films and polysulfone resin films. The protective film may be added with ultraviolet absorbers such as salicylate-based compounds, benzophenone-based compounds, benzotriazol-based compounds, triazine-based compounds, cyanoacrylate-based compounds and nickel complex salt-based compounds of these protective films, acetylcellulose-based films are preferable.

The optical laminate of the invention is composed of a glass substrate layered with the adhesive layer of the adhesive optical film. The glass substrate includes, for example, glass substrates for liquid crystals, glasses having anti-glare property and glasses for sunglasses, of the optical laminates, in order to be allowed to use for liquid crystal displays, preferable is an optical laminate composed of an adhesive optical film (upper polarizing plate) layered with a glass substrate located upper side of a liquid crystal cell and another adhesive optical film (lower polarizing plate) layered with a glass substrate located lower side of the liquid crystal cell. Ingredients of the glass substrate include, for example, soda-lime glass, low alkali glass and no alkali glass.

Methods for producing the adhesive optical film and optical laminate include, for example, a method of layering an adhesive on a peeling film, further layering an optical film on the adhesive layer obtained, peeling off the peeling film to obtain an adhesive optical film, and then successively layering the peeled-off adhesive layer with a face of a glass substrate to obtain an optical laminate; and a method of layering an adhesive on an optical film, affixing a peeling film to protect the layered adhesive to obtain an adhesive optical film, and then, when being layered with a face of a glass substrate, peeling off the peeling film from the adhesive optical film obtained and then layering the peeled adhesive layer with the face of the glass substrate to obtain an optical laminate. The peeling film includes, for example, films composed of resin film substrates provided with mold releasing treatment (silicone treatment and the like) on a surface thereof to be affixed to the adhesive layer, resins of said resin film substrates including polyethylene terephthalates, polybutylene terephthalates, polycarbonates and polyarylate.

In addition, since the glass substrate surface having been contacted to the adhesive layer causes almost no clouding or glue residue thereon after the adhesive optical film being peeled off from the optical laminate of the invention, such glass substrate can be again easily layered with an adhesive optical film, that sa, the reworkability is enhanced.

The liquid crystal display of the invention containes the optical laminate of the invention, and such liquid crystal display includes, for example, liquid crystal displays applied for displays of personal computers such as notebook type, desktop type and PDA (Personal Digital Assistance); liquid crystal televisions, in-car displays, electronic dictionaries, digital cameras, digital video cameras, electronic calculator, clocks and the like

EXAMPLE

The invention is explained in more detail referring to Examples The terms of "parts" or "%" used in Examples represent values in terms of weight except for being exceptionally defined. The nonvolatile content was determined according to the JIS K-5407 code. Specifically, it was represented by a ratio of the resulted dried weight to the sampled solution weight after the following procedures; sampling the solution of adhesive in an appropriate amount and weighing, putting it in a dish, and then putting the dish in an explosion-proof oven to dry the sampled solution at 115° C. for two hours. The viscosity was determined at 25° C. by a Brookfield viscometer. The weight-average molecular weight in terms of standard polystyrene was determined by a gal permeation chromatography (GPC) with the conditions: amount of sample injected, 100 μl; columns sequentially connected in series (two columns of TSKgel G6000H$_{XL}$, two columns of TSKgel G5000H$_{XL}$, commercially available from Tosoh Co., Ltd.); temperature, 40° C.; flow rate, 1 ml/minute; eluate, tetrahydrofuran).

<Production Example of Acrylic Resin 1>

Synthetic Example 1

Into a reactor equipped with a cooler, a tube for inducing nitrogen gas, a thermometer and an agitator, a mixed solution of 81.8 parts of acetone, 98.9 parts of butyl acrylate (hereinafter, abbreviated as EA) as a monomer (A) and 1.1 parts of acrylic acid (hereinafter abbreviated as AA) as a monomer (B) was charged, and then, under being purging oxygen in the reactor by replacing the air therein with nitrogen gas, the mixture in the reactor was heated up to 55° C., and then added with whole portion of a solution prepared by dissolving 0.14 parts of azobisisobutyronitrile (hereinafter, abbreviated as AIBN) in 10 parts of acetone. When 1 hour passed after addition of the initiator, the mixture in the reactor was maintained at 54 to 56° C. for 12 hours under continuously being added with acetone in a rate of 17.3 parts by weight/hour to adjust the concentration of an acrylic resin excluding monomers thereof to 35% by weight, and then finally added with ethyl acetate to adjust the reactant concentration to 20%. The weight-average molecular weight was 1,200,000 and Mw/Mn was 3.9.

Synthetic Example 2

Into a reactor same as applied in Example 1, a mixed solution of 208 parts of acetone, 210 parts of butyl acrylate as a monomer (A) and 2.5 parts of acrylic acid as a monomer (B), and then, under being purging oxygen in the reactor by replacing the air therein with nitrogen gas, the mixture in the reactor was heated up to 55° C., and then added with whole portion of a solution containing 0.15 parts of 2,2'-azobis(2,4-dimethylvaleronitrile) and 5 parts of acetone. Thereafter, the mixture in the reactor was reacted at 55° C. for 11 hours to complete polymerization. The polystyrene-reduced weight-average molecular weight determined by the GPC was 768,000 and Mw/Mn was 3.2.

<Production Example of Acrylic Resin 2>

Synthetic Example 3

Into a reactor same as applied i n Example 1, a mixed solution of 222 parts of ethyl acetate, 35 parts of butyl acrylate, 44 parts of butyl methacrylate, 20 parts of methyl acrylate as a monomer providing the structural unit (a) and 1 part of hydroxyethyl acrylate as a monomer providing the structural unit (b), and then, after replacing the air in the reactor with nitrogen gas, the mixture in the reactor was heated up to 75° C. After being added with whole portion of a solution prepared by dissolving 0.55 parts of AIBN in 12.5 parts of ethyl acetate, the mixture in the reactor was under being kept at 69 to 71° C. maintained at 69 to 71° C. for 8 hours to complete the reaction. The polystyrene-reduced weight-average molecular weight determined by the GPC was 90000 and Tg was −13° C.

Examples 1 to 8, Comparative Example 1 to 8

<Production Example of Adhesive>

The acrylic resins (1) and (2) were mixed in the weight ratio listed in Table 1 to obtain an ethyl acetate solutions of an acrylic resin composition. To 100 parts of nonvolatile content of the solution obtained, a crosslinking agent listed in Table 1 and 0.1 part (solution) of a silicone oligomer (3) were mixed to obtain an adhesives of the invention. Mixing ratios of the acrylic resins (1) and (2), kinds of the silicone oligomer (3) and kinds of the crosslinking agent are collectively shown in Table 1.

TABLE 1

| | | Adhesive Composition | | | | | | | |
|---|---|---|---|---|---|---|---|---|---|
| | | Acrylic Resin (1) | | Acrylic Resin (2) | | | Silane Compound | | Crosslinking Agent |
| | | Non-volatile Content | Synthetic Example | Non-volatile Content | Synthetic Example | "Momomer or Oligomer (3)" | Name | Parts by Weight | Name | Parts by Weight |
| Example 1 | Adhesive 1 | 70 | 1 | 30 | 3 | Oligomer (3) | X-41-1805 | 0.1 | Coronate L | 3.0 |
| Example 2 | Adhesive 2 | 70 | 1 | 30 | 3 | Oligomer (3) | X-41-1810 | 0.1 | Coronate L | 3.0 |
| Example 3 | Adhesive 3 | 70 | 1 | 30 | 3 | Oligomer (3) | X-40-9227 | 0.1 | Coronate L | 1.8 |
| Example 4 | Adhesive 4 | 70 | 1 | 30 | 3 | Oligomer (3) | 3037 INTERMEDIATE | 0.1 | Coronate L | 1.8 |
| Example 5 | Adhesive 5 | 70 | 1 | 30 | 3 | Oligomer (3) | SR2402 | 0.1 | Coronate L | 1.8 |
| Example 6 | Adhesive 6 | 70 | 1 | 30 | 3 | Oligomer (3) | X-41-1053 | 0.1 | Coronate L | 2.3 |
| Example 7 | Adhesive 7 | 70 | 1 | 30 | 3 | Oligomer (3) | X-41-1805 | 0.1 | Coronate L | 1.9 |
| Example 8 | Adhesive 8 | 80 | 1 | 20 | 3 | Oligomer (3) | X-41-1805 | 0.1 | Coronate L | 2.3 |
| Comparative Example 1 | Adhesive 10 | 70 | 1 | 30 | 3 | monomer | 3-mercaptopropyltrimethoxysilane | 0.1 | Coronate L | 3.0 |
| Comparative Example 2 | Adhesive 11 | 70 | 1 | 30 | 3 | monomer | 3-glycidoxypropyltrimethoxysilane | 0.1 | Coronate L | 3.0 |
| Comparative Example 3 | Adhesive 12 | 70 | 1 | 30 | 3 | monomer | 2-(3,4-epoxycyclohexyl)ethyltrimethoxysilane | 0.1 | Coronate L | 3.0 |
| Comparative Example 4 | Adhesive 13 | 70 | 1 | 30 | 3 | monomer | 3-glycidoxypropyldiethoxysilane | 0.1 | Coronate L | 3.0 |
| Comparative Example 5 | Adhesive 14 | 100 | 1 | — | — | monomer | Y11597 | 0.1 | Takenate L D160N | 0.12 |
| Comparative Example 6 | Adhesive 15 | 100 | 2 | — | — | monomer | 3-mercaptopropyltrimethoxysilane | 0.1 | Coronate L | 3.0 |

TABLE 1-continued

| | | Adhesive Composition | | | | | | | |
|---|---|---|---|---|---|---|---|---|---|
| | | Acrylic Resin (1) | | Acrylic Resin (2) | | | Silane Compound | | Crosslinking Agent |
| | | Non-volatile Content | Synthetic Example | Non-volatile Content | Synthetic Example | "Momomer or Oligomer (3)" | Name | Parts by Weight | Name | Parts by Weight |
| Comparative Example 7 | Adhesive 16 | 100 | 1 | — | — | Oligomer (3) | 3037 INTERMEDIATE | 0.1 | Coronate L | 3.0 |
| Comparative Example 8 | Adhesive 17 | 100 | 1 | — | — | Oligomer (3) | X-41-1805 | 0.1 | Coronate L | 3.0 |

<Production Example of Optical Laminate>
<Production Example of Adhesive Optical Film and Optical Laminate>

Thus obtained adhesive was coated by an applicator on a mold-releasing treated surface of a mold-releasing treated polyethylene terephthalate film (commercially available from LINTEC, trade name PET3811) to obtain a film thereof to be 25 μm thick after being dried, followed by drying at 90° C. for 1 minute to obtain a sheet-shape adhesive. Then, a polarizing film (the film having three-layer structure in which triacetylcellulose-based protective films were layered on both surfaces of an oriented film of polyvinylalcohol adsorbing iodine) was prepared as an optical film, and the surface having the adhesive obtained above was affixed on said optical film by a laminater, followed by subjecting to maturing at 23° C. under 65% of humidity for 10 days to obtain an adhesive optical film having an adhesive layer. This adhesive optical film was consecutively affixed to both surface of a glass substrate (commercially available from Corning Incorporated, 1737) for liquid crystal cell in crossed nicols configuration to obtain an optical laminate. This film was preserved in the following three cases, i.e. a case preserving at 80° C. under dry situation for 96 hours (heat resistibility), a came preserving at 60° C. under 90% of RH for 96 hours (humidity resistibility) and a case, by setting 1 cycle (1 hour) constituted with steps of heating at 60° C., cooling down to −20° C. and then heating up to 60° C., preserving under 100 cycles (heat shock resistibility, represented as "HS" in Table 2); the optical laminate was visually observed about its durability and generation of white defects at the condition 1 after having been preserved according to the above cases. The results were evaluated as follows, and the evaluation results are shown in Table 2.

<White Defects of Optical Laminate>
Generation of white defects was evaluated according to the following 4 rating criteria.
○: Generation of white defects was almost not observed.
Δ: Generation of white defects was slightly observed.
×: Generation of white defects was remarkably observed.

<Wet-Heat Resistibility, Heat Resistibility and Heat-Shock Resistibility (HS Resistibility)>
These were evaluated according to the following 4 rating criteria.
◎: No appearance changes such as blistering, peeling or foaming were observed.
○: Appearance changes such as blistering, peeling or foaming were almost not observed.
Δ: Appearance changes such as blistering, peeling or foaming were slightly observed.
×: Appearance changes such as blistering, peeling or foaming were remarkably observed.

<Reworkability>
Reworkability was evaluated as follows. The above-mentioned optical laminate was prepared to a test piece having a size of 25 mm×150 mm. Then the piece was affixed on a glass substrate for liquid crystal by a laminater (commercially available from FUJI Plastic KIKAI K. K., Lamipacker), followed by subjecting to an autoclave treatment at 50° C. with 5 kg/cm² (490.3 kPa) for 20 minutes. Consecutively being subjected to heating treatment at 70° C. for 2 hours, being preserved in an oven at 50° C. for 48 hours, and then this test piece for adhesivility was peeled apart in the directions of 180 degree at 23° C. under atmosphere of relative humidity of 50% RH at the speed of 300 mm/min, state of the glass surface was observed and evaluated according to the following classifications. The evaluation results are shown in Table 1.
◎: Clouding and the like on the glass surface were not observed.
○: Clouding and the like on the glass surface were almost not observed.
Δ: Clouding and the like on the glass surface were observed.
×: Glue residue on the glass surface was observed.

TABLE 2

| | | Silicone Oligomer (3) in Adhesive | White Defects | Wet-Heat Resistibility | Heat Resistibility | HS Resistibility | Reworkability |
|---|---|---|---|---|---|---|---|
| Example 1 | Adhesive 1 | X-41-1805 | ○ | ◎ | ◎ | ◎ | ◎ |
| Example 2 | Adhesive 2 | X-41-1810 | ○ | ○ | ◎ | ○ | ○ |
| Example 3 | Adhesive 3 | X-40-9227 | ○ | ○ | ○ | ◎ | ○ |
| Example 4 | Adhesive 4 | 3037 INTERMEDIATE | ○ | ○ | ○ | ◎ | ○ |
| Example 5 | Adhesive 5 | SR2402 | ○ | ○ | ○ | ○ | ○ |

TABLE 2-continued

| | | Silicone Oligomer (3) in Adhesive | White Defects | Wet-Heat Resistibility | Heat Resistibility | HS Resistibility | Reworkability |
|---|---|---|---|---|---|---|---|
| Example 6 | Adhesive 6 | X-41-1053 | ○ | ⊚ | ⊚ | ⊚ | ⊚ |
| Example 7 | Adhesive 7 | X-41-1805 | ○ | ⊚ | ⊚ | ⊚ | ⊚ |
| Example 8 | Adhesive 8 | X-41-1805 | ○ | ⊚ | ○ | ⊚ | ⊚ |
| Comparative Example 1 | Adhesive 10 | 3-mercaptopropyltrimethoxysilane | ○ | ○ | X | X | ○ |
| Comparative Example 2 | Adhesive 11 | 3-glycidoxypropyltrimethoxysilane | ○ | ⊚ | ⊚ | ○ | X |
| Comparative Example 3 | Adhesive 12 | 2-(3,4-epoxycyclohexyl)ethyltrimethoxysilane | Δ | ⊚ | ⊚ | ⊚ | X |
| Comparative Example 4 | Adhesive 13 | 3-glycidoxypropyldiethoxysilane | ○ | ○ | ⊚ | ○ | X |
| Comparative Example 5 | Adhesive 14 | Y11597 | ○ | X | ○ | Δ | ○ |
| Comparative Example 6 | Adhesive 15 | 3-mercaptopropyltrimethoxysilane | ○ | ⊚ | ⊚ | X | ⊚ |
| Comparative Example 7 | Adhesive 16 | 3037 INTERMEDIATE | X | X | Δ | X | ⊚ |
| Comparative Example 8 | Adhesive 17 | X-41-1805 | X | ⊚ | ○ | ⊚ | ⊚ |

X-41-1805: 3-mercaptopropyltrimethoxysilane-tetraethoxysilane copolymer, commercially available from Shin-Etsu Chemical Co., Ltd. Polymerization degree of 40 (according to products catalog)
X-41-1810: 3-mercaptopropyltrimethoxysilane-tetramethoxysilane copolymer, commercially available from Shin-Etsu Chemical Co., Ltd.
3037 INTERMEDIATE: phenymethyl-based silicone copolymer, commercially available from TORAY DOW CORNING SILICONE Co.Ltd.
SR2402: methyl-based silicone copolymer, commercially available from TORAY DOW CORNING SILICONE Co.Ltd.
Y-11597: 1,3,5-tris(3-trimethoxysilylpropyl)isocyanurate, commercially available from TORAY DOW CORNING SILICONE Co.Ltd.
X-40-1053: γ-glycidoxypropyltrimethoxysilane-tetraethoxysilane copolymer, commercially available from Shin-Etsu Chemical Co., Ltd. Coronate
L: trimethylolpropan adduct of trylenediisocyanate, commercially available from Nippon Polyurethane Industry Co., Ltd.
Takepate D160N: trimethylolpropan adduct of hexamethylenediisocyanate, commercially available from Mitsui Takeda Chemicals, Inc., The optical laminate of the invention is suitable to optical laminates such as TN liquid crystals (TFT) and STN liquid crystals. By applying the optical laminate of the invention to STN liquid crystals, the optical laminates obtained are allowed to suppress color irregularity thereof.

The invention, since it has superior abilities of anti-white defects and durability even in large scale size, is suitably applied to liquid crystal displays.

What is claimed is:

1. An adhesive comprising an acrylic resin (1), an acrylic resin (2), a silicone oligomer (3) and a crosslinking agent (4): wherein the acrylic resin (1) comprises a structural unit (a) derived from a monomer (A) and a structural unit (b) derived from a monomer (B) and has a weight-average molecular weight of 1,000,000 to 2,000,000, wherein the monomer (A) is a (meth)acrylic ester represented by the formula (A)

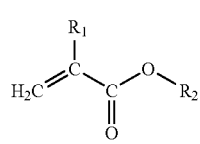

(A)

(wherein $R_1$ represents hydrogen atom or methyl group, and $R_2$ represents alkyl or aralkyl groups having 1 to 14 carbon atoms wherein hydrogen atom(s) of the $R_2$ may be substituted with alkoxy group having 1 to 10 carbon atoms), and the monomer (B) is at least any one of a (B-1) and a (B-2) wherein (B-1) is a monomer comprising carboxyl group and one olefinic double bond, and (B-2) is a monomer comprising at least one polar functional group selected from the group consisting of hydroxy group, amide group, amino group, epoxy group, oxetanyl group, aldehyde group and isocyanate group and an olefinic double bond;

the acrylic resin (2) comprises the structural unit (a) and the structural unit (b) and has a weight-average molecular weight of 50,000 to 500,000;

wherein the silicone oligomer (3) comprises 2 to 100 structure units (s) derived from a compound (S1) and a compound (S2) respectively represented by

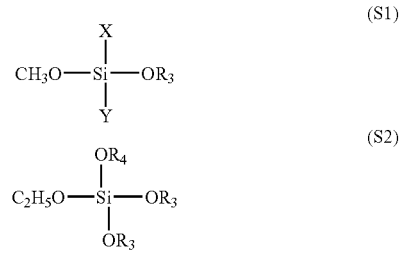

(wherein $R_3$ and $R_4$ represent alkyl group or phenyl group, X and Y represent hydrogen atom, optionally substituted alkyl group, optionally substituted phenyl group, optionally substituted alkoxy group, optionally substituted phenoxy group, optionally substituted aralkyl group, optionally substituted aralkyloxy group, vinyl group, vinyloxy group, 1,2-epoxycyclohexyl group, 1,2-epoxycyclohexyloxy group, styryl group, styryloxy group, methacryloyloxy group, amino group, ureido group, mercapto group or isocyanate group).

2. The adhesive according to claim 1, wherein the crosslinking agent (4) is an isocyanate-based compound.

3. The adhesive according to claim 1 comprising, based on 100 parts by weight of the acrylic resin (1), 10 to 50 parts by weight of the acrylic resin (2), 0.001 to 5 parts by weight of the silicone oligomer (3) and 0.001 to 10 parts by weight of the crosslinking agent (4).

4. The adhesive according to claim 2 comprising, based on 100 parts by weight of the acrylic resin (1), 10 to 50 parts by weight of the acrylic resin (2), 0.001 to 5 parts by weight of the silicone oligomer (3) and 0.001 to 10 parts by weight of the crosslinking agent (4).

5. An adhesive optical film comprising the adhesive according to claim 1 layered on any one or both of surfaces of an optical film.

6. The adhesive optical film according to claim 5, wherein the optical film is a polarizing film and/or a retardation film.

7. The adhesive optical film according to claim 5 wherein the optical film is further affixed with an acetylcellulose-based film as a protective film.

8. The adhesive optical film according to claim 6, wherein the optical film is further affixed with an acetylcellulose-based film as a protective film.

9. The adhesive optical film according to claim 5 further layered with a peeling film on the adhesive layer thereof.

10. The adhesive optical film according to claim 6 further layered with a peeling film on the adhesive layer thereof.

11. An optical laminate comprising a glass substrate layered on the adhesive layer of the adhesive optical film according to claim 5.

12. An optical laminate comprising a glass substrate layered on the adhesive layer of the adhesive optical film according to claim 7.

13. An optical laminate comprising a glass substrate layered on the adhesive layer of the adhesive optical film according to claim 8.

14. An adhesive comprising an acrylic resin (1), an acrylic resin (2), a silicone oligomer (3) and a crosslinking agent (4): wherein the acrylic resin (1) comprises a structural unit (a) derived from a monomer (A) and a structural unit (b) derived from a monomer (B) and has a weight-average molecular weight of 1,000,000 to 2,000,000, wherein the monomer (A) is a (meth)acrylic ester represented by the formula (A)

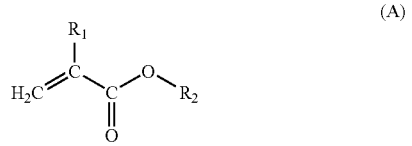

(A)

(wherein $R_1$ represents hydrogen atom or methyl group, and $R_2$ represents alkyl or aralkyl groups having 1 to 14 carbon atoms wherein hydrogen atom(s) of the $R_2$ may be substituted with alkoxy group having 1 to 10 carbon atoms), and the monomer (B) is at least any one of a (B-1) and a (B-2) wherein (B-1) is a monomer comprising carboxyl group and one olefinic double bond, and (B-2) is a monomer comprising at least one polar functional group selected from the group consisting of hydroxy group, amide group, amino group, epoxy group, oxetanyl group, aldehyde group and isocyanate group and an olefinic double bond;

the acrylic resin (2) comprises the structural unit (a) and the structural unit (b) and has a weight-average molecular weight of 50,000 to 500,000;

wherein the silicone oligomer (3) comprises 2 to 100 structural unit(s) derived from a compound (S3) and a compound (S4) respectively represented by

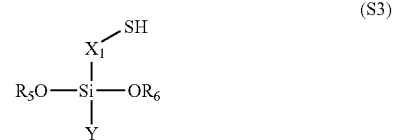

(S3)

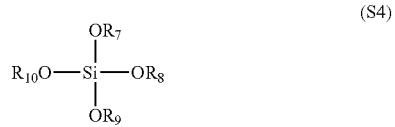

(S4)

(wherein $R_5$ and $R_{10}$ each independently represents an alkyl group or a phenyl group, $X_1$ represents alkylene group having 1 to 10 carbon atoms and Y represent hydrogen atom, optionally substituted alkyl group, optionally substituted phenyl group, optionally substituted alkoxy group, optionally substituted phenoxy group, optionally substituted aralkyl group, optionally substituted aralkyloxy group, vinyl group, vinyloxy group, 1,2-epoxycyclohexyl group, 1,2-epoxycyclohexyloxy group, styryl group, styryloxy group, methacryloyloxy group, amino group, ureido group, mercapto group or isocyanate group.

15. The adhesive according to claim 14, wherein the crosslinking agent (4) is an isocyanate-based compound.

16. The adhesive according to claim 14 comprising, based on 100 parts by weight of the acrylic resin (1), 10 to 50 parts by weight of the acrylic resin (2), 0.001 to 5 parts by weight of the silicone oligomer (3) and 0.001 to 10 parts by weight of the crosslinking agent (4).

17. The adhesive according to claim 15 comprising, based on 100 parts by weight of the acrylic resin (1), 10 to 50 parts by weight of the acrylic resin (2), 0.001 to 5 parts by weight of the silicone oligomer (3) and 0.001 to 10 parts by weight of the crosslinking agent (4).

18. An adhesive optical film comprising the adhesive according to claim 14 layered on any one or both of surfaces of an optical film.

19. The adhesive optical film according to claim 18, wherein the optical film is a polarizing film and/or a retardation film.

20. The adhesive optical film according to claim 18, wherein the optical film is further affixed with an acetylcellulose-based film as a protective film.

21. The adhesive optical film according to claim 19 wherein the optical film is further affixed with an acetylcellulose-based film as a protective film.

22. The adhesive optical film according to claim 18 further layered with a peeling film on the adhesive layer thereof.

23. The adhesive optical film according to claim 19 further layered with a peeling film on the adhesive layer thereof.

24. An optical laminate comprising a glass substrate layered on the adhesive layer of the adhesive optical film according to claim 18.

25. An optical laminate comprising a glass substrate layered on the adhesive layer of the adhesive optical film according to claim 20.

26. An optical laminate comprising a glass substrate layered on the adhesive layer of the adhesive optical film according to claim 21.

* * * * *

UNITED STATES PATENT AND TRADEMARK OFFICE
CERTIFICATE OF CORRECTION

| | | |
|---|---|---|
| PATENT NO. | : 7,585,570 B2 | Page 1 of 1 |
| APPLICATION NO. | : 11/279313 | |
| DATED | : September 8, 2009 | |
| INVENTOR(S) | : Ryu Takeko | |

It is certified that error appears in the above-identified patent and that said Letters Patent is hereby corrected as shown below:

On the Title page,

[*] Notice:   Subject to any disclaimer, the term of this patent is extended or adjusted under 35 USC 154(b) by (350) days Delete the phrase "by 350 days" and insert -- by 500 days --

Signed and Sealed this

Thirtieth Day of March, 2010

David J. Kappos
*Director of the United States Patent and Trademark Office*